US012695103B2

(12) United States Patent
Oh et al.

(10) Patent No.: US 12,695,103 B2
(45) Date of Patent: Jul. 28, 2026

(54) FUEL CELL MEMBRANE HUMIDIFIER

(71) Applicant: KOLON INDUSTRIES, INC., Seoul (KR)

(72) Inventors: Young Seok Oh, Seoul (KR); Ah Reum Lee, Seoul (KR); Ji Yoon Lee, Seoul (KR); Kyoung Ju Kim, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 477 days.

(21) Appl. No.: 18/260,952

(22) PCT Filed: Jan. 27, 2022

(86) PCT No.: PCT/KR2022/001434
§ 371 (c)(1),
(2) Date: Jul. 11, 2023

(87) PCT Pub. No.: WO2022/177200
PCT Pub. Date: Aug. 25, 2022

(65) Prior Publication Data
US 2024/0063409 A1 Feb. 22, 2024

(30) Foreign Application Priority Data
Feb. 17, 2021 (KR) ........................ 10-2021-0021151

(51) Int. Cl.
*H01M 8/04* (2016.01)
*H01M 8/04119* (2016.01)
(52) U.S. Cl.
CPC .............................. *H01M 8/04149* (2013.01)
(58) Field of Classification Search
CPC ............................................. H01M 8/04149
See application file for complete search history.

(56) References Cited

U.S. PATENT DOCUMENTS 5,779,897 A * 7/1998 Kalthod ................. B01D 53/22
                                                        210/321.89
9,209,467 B2 * 12/2015 Kim .................. H01M 8/04141
(Continued)

FOREIGN PATENT DOCUMENTS

CN 110440051 A 11/2019
JP 2007061677 A 3/2007
(Continued)

OTHER PUBLICATIONS

JP Office Action dated Nov. 26, 2024.
(Continued)

*Primary Examiner* — Robert A Hopkins
(74) *Attorney, Agent, or Firm* — Harvest IP Law, LLP

(57) ABSTRACT

The present invention relates to a fuel cell membrane humidifier which adjusts a clearance between hollow fiber membranes according to a temperature of a fluid flowing between the hollow fiber membranes to improve humidification efficiency. A fuel cell membrane humidifier according to an embodiment of the present invention comprises: a mid-case; a cap fastened to the mid-case; a plurality of hollow fiber membranes disposed in the mid-case and exchanging moisture with an air supplied from the outside and flue gas introduced from a fuel cell stack to humidify the air; and a clearance adjustment pipe disposed between the plurality of hollow fiber membranes and formed of a material having a thermal expansion coefficient different from that of the plurality of hollow fiber membranes, so as to adjust the clearance between the plurality of hollow fiber membranes according to a temperature of flue gas.

9 Claims, 7 Drawing Sheets

(56)        References Cited

U.S. PATENT DOCUMENTS

| | | |
|---|---|---|
| 2017/0100701 A1 | 4/2017 | Kim |
| 2019/0067717 A1 | 2/2019 | Shinozaki |

FOREIGN PATENT DOCUMENTS

| | | |
|---|---|---|
| JP | 2010-071619 A | 4/2010 |
| JP | 2019-46585 A | 3/2019 |
| JP | 2019046585 A | 3/2019 |
| KR | 20090013304 A | 2/2009 |
| KR | 20090057773 A | 6/2009 |
| KR | 20090128005 A | 12/2009 |
| KR | 20100108092 A | 10/2010 |
| KR | 10-1000650 B1 | 12/2010 |
| KR | 20100131631 A | 12/2010 |
| KR | 20110001022 A | 1/2011 |
| KR | 20110006122 A | 1/2011 |
| KR | 20110006128 A | 1/2011 |
| KR | 20110021217 A | 3/2011 |
| KR | 20110026696 A | 3/2011 |
| KR | 20110063366 A | 6/2011 |
| KR | 10-1144076 B1 | 5/2012 |
| KR | 20190035002 A | 4/2019 |
| KR | 10-2019-0081736 A | 7/2019 |
| KR | 20190081736 A | 7/2019 |
| KR | 10-2020-0122260 A | 10/2020 |
| KR | 2020-0122260 A | 10/2020 |
| WO | 2014/030293 A1 | 2/2014 |
| WO | 2020/213990 A1 | 10/2020 |

OTHER PUBLICATIONS

Nabetani K et al. "Suppression of temperature hysteresis in negative thermal expansion compound BiNii-xFex03and zero-thermal expansion composite" Applied Physics Letters, American Institute of Physics, 2 Huntington Quadrangle, Melville, NY11747, vol. 106, No. 6, Feb. 9, 2015, XP012194599.

European Search Report, dated Sep. 18, 2024, for a corresponding EP patent application.

Suppression of temperature hysteresis in negative thermal expansion compound $BiNi1-x Fe_x O3$ and zero-thermal expansion composite., K. Nabetani et al.

"Suppression of temperature hysteresis in negative thermal expansion compound $BiNi1\_xFexO3$ and zero-thermal expansion composite", Applied physics letters, vol. 106, 061912(Feb. 9, 2015.).

KR OA dated May 28, 2024.

JP OA dated Jun. 25, 2024.

Kato D, Sohn WY, Katayama K. Aggregation-Induced Expansion of Poly-(N-isopropyl acrylamide) Solutions Observed Directly by the Transient Grating Imaging Technique. ACS Omega. Aug. 1, 2018;3(8):8484-8490.

Office Action From Canadian Patent Office, Dated Oct. 7, 2025.

\* cited by examiner (a)

(b)

$$\left(\begin{array}{c} \text{High output (high temperature)} \\ \longrightarrow \text{contraction} \longrightarrow \text{gap} \uparrow \end{array}\right)$$

$$\left(\begin{array}{c} \text{Low output (low temperature)} \\ \longrightarrow \text{expansion} \longrightarrow \text{gap} \downarrow \end{array}\right)$$

FUEL CELL MEMBRANE HUMIDIFIER

CROSS REFERENCE TO RELATED APPLICATION

This application is a National Stage filing under 35 U.S.C. 371 of International Application No. PCT/KR2022/001434 filed on Jan. 27, 2022 and claims priority to Korean Patent Application No. 10-2021-0021151 filed on Feb. 17, 2021, the disclosures of which is incorporated herein by reference in its entirety.

TECHNICAL FIELD

The present invention relates to a fuel cell membrane humidifier, and more particularly, to a fuel cell membrane humidifier capable of improving humidification efficiency by adjusting a gap between hollow fiber membranes depending on a temperature of a fluid flowing between the hollow fiber membranes.

BACKGROUND ART

Fuel cells are power generation cells that produce electricity through coupling between hydrogen and oxygen. The fuel cells have an advantage of being able to continuously produce electricity as long as the hydrogen and the oxygen are supplied, and having an efficiency that is about twice higher than an internal combustion engine because of no heat loss, unlike general chemical cells such as dry batteries or storage batteries.

Further, since chemical energy generated through coupling between the hydrogen and the oxygen is directly converted into electrical energy, emission of pollutants is reduced. Therefore, the fuel cells have an advantage of being environmentally friendly and being able to reduce concerns about resource depletion due to increased energy consumption.

These fuel cells are roughly classified into, for example, a polymer electrolyte membrane fuel cell (PEMFC), a phosphoric acid fuel cell (PAFC), a molten carbonate fuel cell (MCFC), a solid oxide fuel cell (SOFC), and an alkaline fuel cell (AFC) depending on a type of electrolyte used.

These fuel cells fundamentally operate according to the same principle, but have a difference in a type of fuel used, an operating temperature, a catalyst, an electrolyte, or the like. Among the cells, the polymer electrolyte membrane fuel cell (PEMFC) is known to be the most promising not only for small-scale stationary power generation equipment but also for transportation systems because the polymer electrolyte membrane fuel cell operates at a lower temperature than other fuel cells and can be miniaturized due to a high output density.

One of the most important factors in improving the performance of the polymer electrolyte membrane fuel cell (PEMFC) is to maintain moisture content by supplying a certain amount or more of moisture to a polymer electrolyte membrane (or proton exchange membrane: PEM) of a membrane electrode assembly (MEA). This is because the efficiency of power generation is rapidly degraded when the polymer electrolyte membrane is dried.

Examples of a method for humidifying the polymer electrolyte membrane include 1) a bubbler humidification scheme for filling a pressure-resistant container with water and then passing a target gas through a diffuser to supply moisture, 2) a direct injection scheme for calculating a moisture supply amount required for a fuel cell reaction and directly supplying moisture to a gas flow pipe through a solenoid valve, and 3) a humidification membrane scheme for supplying moisture to a fluidized gas layer using a polymer separation membrane.

Among these, the membrane humidification scheme for humidifying a polymer electrolyte membrane by providing water vapor to air supplied to the polymer electrolyte membrane using a membrane that selectively permeates only water vapor contained in an off-gas is advantageous in that a weight and size of a membrane humidifier can be reduced.

A selective permeable membrane used in the membrane humidification scheme is preferably a hollow fiber membrane having a large permeable area per unit volume when a module is formed. That is, when a membrane humidifier is manufactured using hollow fiber membranes, there are advantages that high integration of the hollow fiber membranes with a large contact surface area is possible so that a fuel cell can be sufficiently humidified even with a small capacity, low cost materials can be used, and moisture and heat contained in an off-gas discharged with a high temperature from the fuel cell can be recovered and can be reused through the membrane humidifier.

FIG. 1 is an exploded perspective view illustrating a fuel cell membrane humidifier according to the related art. As illustrated in FIG. 1, the fuel cell membrane humidifier 10 of the related art includes a humidification module 11 in which moisture exchange between air supplied from the outside and an off-gas discharged from a fuel cell stack (not illustrated) occurs, and caps 12 coupled to both ends of the humidification module 11.

One of the caps 12 supplies the air supplied from the outside to the humidification module 11, and the other supplies air humidified by the humidification module 11 to the fuel cell stack.

The humidification module 11 includes a mid-case 11*a* having an off-gas inlet 11*aa* and an off-gas outlet 11*ab*, and a plurality of hollow fiber membranes 11*b* in the mid-case 11*a*. Both ends of a bundle of hollow fiber membranes 11*b* are fixed to potting portions 11*c*. The potting portions 11*c* are generally formed by curing a liquid polymer such as a liquid polyurethane resin through a casting scheme.

The air supplied from the outside flows along hollows of the hollow fiber membranes 11*b*. The off-gas flowing into the mid-case 11*a* through the off-gas inlet 11*aa* comes into contact with outer surfaces of the hollow fiber membranes 11*b*, and then, is discharged from the mid-case 11*a* through the off-gas outlet 11*ab*. When the off-gas comes into contact with the outer surfaces of the hollow fiber membranes 11*b*, moisture contained in the off-gas permeates the hollow fiber membranes 11*b* to humidify the gas flowing along the hollows of the hollow fiber membranes 11*b*.

DISCLOSURE

Technical Problem

An object of the present invention is to provide a fuel cell membrane humidifier capable of improving humidification efficiency by adjusting a gap between hollow fiber membranes depending on a temperature of a fluid flowing between the hollow fiber membranes.

Technical Solution

A fuel cell membrane humidifier according to an embodiment of the present invention includes a mid-case; a cap fastened to the mid-case; a plurality of hollow fiber membranes disposed inside the mid-case and perform moisture exchange between air supplied from the outside and an off-gas flowing into the inside from a fuel cell stack to humidify the air; and a gap adjustment pipe disposed between the plurality of hollow fiber membranes and formed of a material having a different coefficient of thermal expansion from the plurality of hollow fiber membranes to adjust gaps between the plurality of hollow fiber membranes depending on a temperature of the off-gas.

In the fuel cell membrane humidifier according to the embodiment of the present invention, the gap adjustment pipe may include a negative thermal expansion material expanding in a first temperature range and contracting in a second temperature range greater than the first temperature range.

In the fuel cell membrane humidifier according to the embodiment of the present invention, the gap adjustment pipe may include bismuth (Bi).

In the fuel cell membrane humidifier according to the embodiment of the present invention, the gap adjustment pipe may include oxides of bismuth (Bi), lanthanum (La), and nickel (Ni).

In the fuel cell membrane humidifier according to the embodiment of the present invention, the gap adjustment pipe may include oxides of bismuth (Bi), iron (Fe), and nickel (Ni).

The fuel cell membrane humidifier according to an embodiment of the present invention may include a humidification module including an inner case configured to accommodate the plurality of hollow fiber membranes, and at least one cartridge including potting portions formed at ends of the inner case.

The fuel cell membrane humidifier according to the embodiment of the present invention may include a gasket assembly, wherein the gasket assembly may include a packing portion including a body member having a hole into which an end of the cartridge is inserted, and a protrusion member formed at one end of the body member and coming into contact with the end of the cartridge inserted into the hole to prevent a fluid in the mid-case from flowing toward the cap; an edge portion formed at the other end of the body member and formed in a space formed by a groove formed at an end of the mid-case and an end of the cap; and a sealing portion formed to come into contact with the cartridge and the packing portion to prevent the fluid in the mid-case from flowing toward the cap.

In the fuel cell membrane humidifier according to the embodiment of the present invention, the body member may include two or more holes into which two or more cartridges are able to be inserted, two or more protrusion members may be included and formed in contact with ends of the two or more cartridges, and two or more sealing portions may be included and formed to come into contact with the two or more cartridges and the packing portion.

In the fuel cell membrane humidifier according to the embodiment of the present invention, the protrusion member may press and come into contact with the end of the cartridge according to elastic force to make a space on the mid-case side and a space on the cap side airtight.

In the fuel cell membrane humidifier according to the embodiment of the present invention, the edge portion may include edge wings protruding in both directions, and the edge wings may be interposed with the groove formed at the end of the mid-case filled with the edge wings, to seal the inside and outside of the mid-case, the mid-case, and the cap.

In the fuel cell membrane humidifier according to the embodiment of the present invention, each of the packing portion and the edge portion may have a first hardness of 30 to 70 Shore A, and the fuel cell membrane humidifier may further include a reinforcing member formed to be inserted into at least a portion of the packing portion and at least a portion of the edge portion, the reinforcing member having a second hardness higher than the first hardness.

Other specific matters of implementation examples according to various aspects of the present invention are included in the detailed description below.

Advantageous Effects

According to the present invention, it is possible to improve humidification efficiency by adjusting a gap between the hollow fiber membranes depending on a temperature of a fluid flowing between the hollow fiber membranes through a gap adjustment pipe having a different coefficient of thermal expansion from the hollow fiber membranes disposed between the hollow fiber membranes.

Mode for Disclosure

Since various changes may be made to the present invention, which may have several embodiments, specific embodiments will be illustrated and described in detail herein. However, it will be understood that this is not intended to limit the present invention to the specific embodiments, and all changes, equivalents, or substitutions included in the spirit and scope of the present invention are included.

The terms used herein are for the purpose of describing specific embodiments only and are not intended to limit the present invention. The singular forms "a," "an" and "the" include the plural forms, unless the context clearly indicates otherwise. It will be understood that the terms "comprises," "comprising," "includes" and/or "including," herein specify the presence of stated features, integers, steps, operations, elements, and/or components, but do not preclude the presence or addition of one or more other features, integers, steps, operations, elements, components, and/or groups thereof. Hereinafter, a fuel cell membrane humidifier according to embodiments of the present invention will be described with reference to the drawings.

Figure 2:
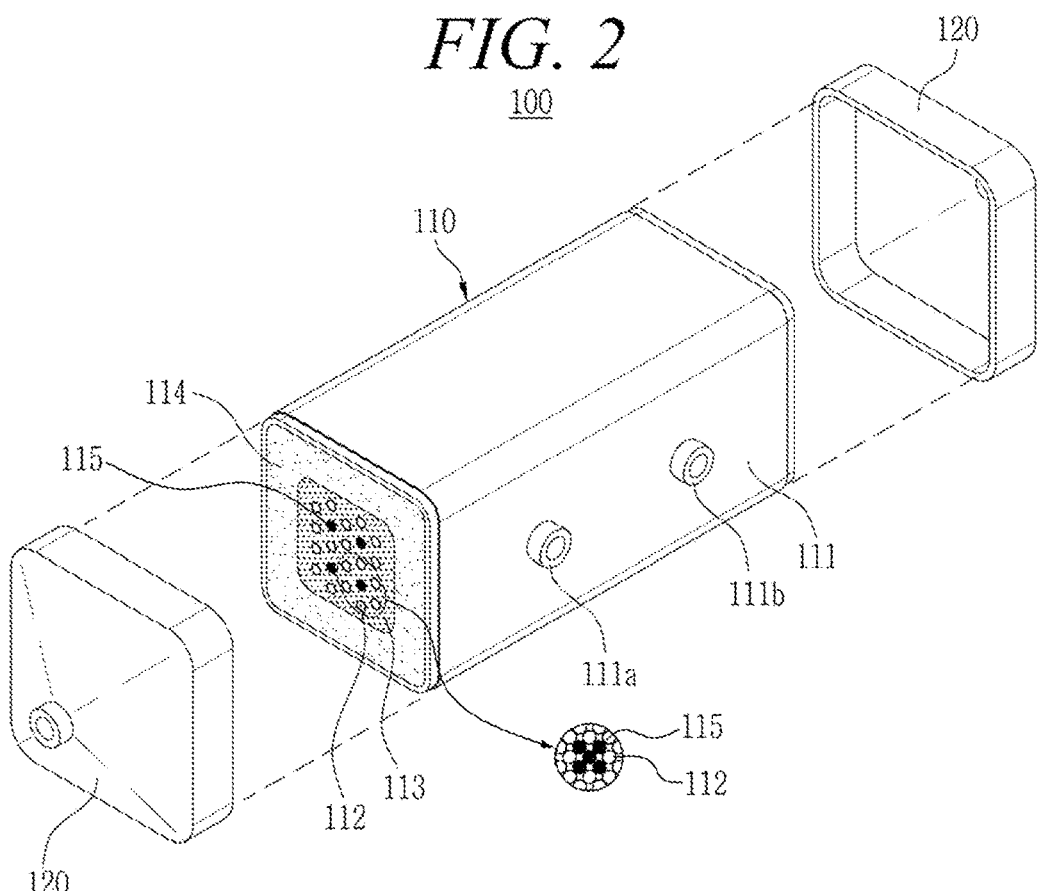
FIG. 2 is an exploded perspective view illustrating a fuel cell membrane humidifier according to a first embodiment of the present invention.
Figure 3:
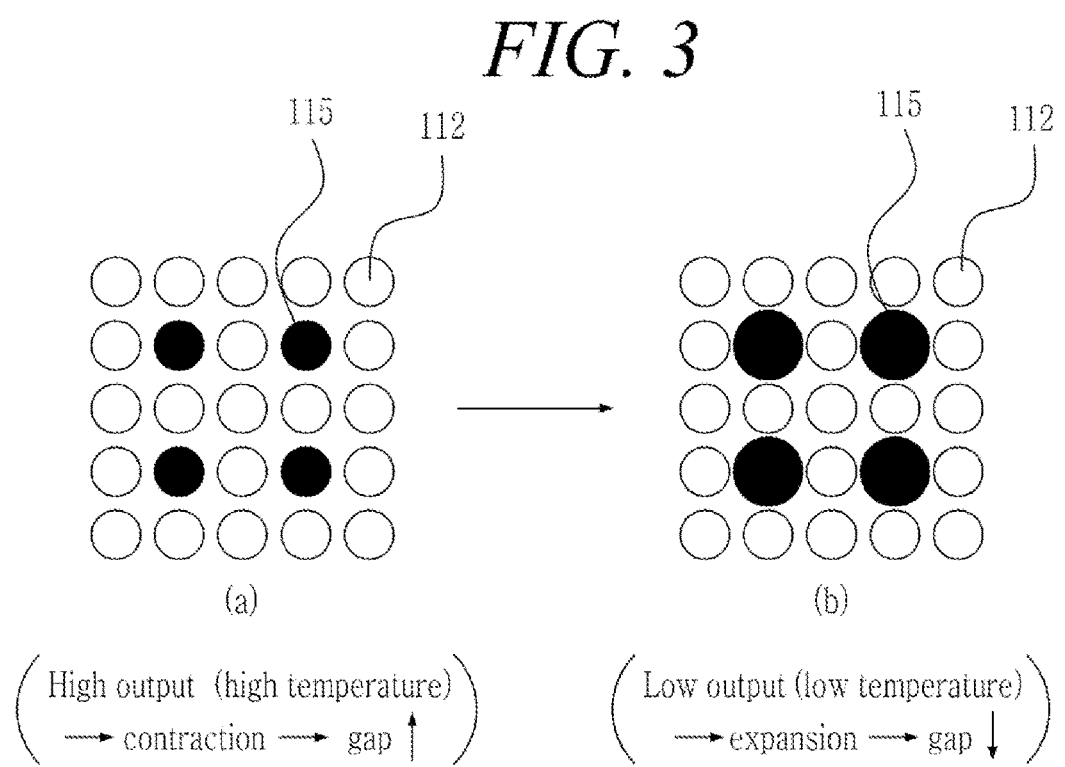
FIG. 3 is a conceptual diagram illustrating an operating state within a humidification module of the fuel cell membrane humidifier according to the first embodiment of the present invention.

FIG. 2 is an exploded perspective view illustrating a fuel cell membrane humidifier according to a first embodiment of the present invention, and FIG. 3 is a conceptual diagram illustrating an operating state in a humidification module of the fuel cell membrane humidifier according to the first embodiment of the present invention.

Referring to FIG. 2, a fuel cell membrane humidifier 100 according to an embodiment of the present invention includes a humidification module 110 and caps 120.

The humidification module 110 performs moisture exchange between air supplied from the outside and an off-gas discharged from a fuel cell stack (not illustrated). The caps 120 are coupled to both ends of the humidification module 110.

One of the caps 120 supplies the air supplied from outside to the humidification module 110, and the other supplies air humidified by the humidification module 110 to the fuel cell stack.

The humidification module 110 includes a mid-case 111 including an off-gas inlet 111a and an off-gas outlet 111b, and a plurality of hollow fiber membranes 112 accommodated in the mid-case 111. Further, a gap adjustment pipe 115 is disposed between the hollow fiber membranes 112.

The hollow fiber membranes 112 may include a polymer membrane formed of a polysulfone resin, a polyethersulfone resin, a sulfonated polysulfone resin, a polyvinylidene fluoride (PVDF) resin, a polyacrylonitrile (PAN) resin, a polyimide resin, a polyamideimide resin, a polyesterimide resin, or a mixture of two or more of these.

Both ends of the bundle of hollow fiber membranes 112 are fixed to the potting portions 113. The potting portion 113 is generally formed by curing a liquid polymer such as a liquid polyurethane resin through a casting scheme. Further, both ends of the gap adjustment pipe 115 may also be fixed to the potting portion 113.

The gap adjustment pipe 115 is formed of a material having a different coefficient of thermal expansion from the hollow fiber membrane 112. The gap adjustment pipe 115 may or may not have a hollow formed inside. The coefficient of thermal expansion is preferably a coefficient of volume expansion. That is, it is more preferable for the gap adjustment pipe 115 to be formed of a material having a different coefficient of volume expansion from the hollow fiber membrane 112.

Specifically, the gap adjustment pipe 115 may include a negative thermal expansion material that expands in a first temperature range and contracts in a second temperature range greater than the first temperature range. That is, the gap adjustment pipe 115 may include a negative thermal expansion material that expands at a low temperature and contracts at a high temperature.

Most materials increase in length or volume due to thermal expansion when temperature rises, whereas negative thermal expansion materials have a property that the negative thermal expansion materials contract when the temperature rises. This negative thermal expansion material may be a material containing bismuth (Bi).

Specifically, the negative thermal expansion material may be a material including oxides of bismuth (Bi), lanthanum (La), and nickel (Ni). More specifically, the negative thermal expansion material may be $Bi_{0.95}La_{0.05}NiO_3$ (bismuth lanthanum nickel oxide). $Bi_{0.95}La_{0.05}NiO_3$ exhibits negative thermal expansion of 82 parts per million ($-82\times10^{-6}/°$ C.) per $1°$ C. of temperature increase.

Further, specifically, the negative thermal expansion material may be a material including oxides of bismuth (Bi), iron (Fe), and nickel (Ni). More specifically, the negative thermal expansion material may be an oxide $BiNi_{1-x}Fe_xO_3$ (bismuth nickel iron oxide) having a structure called 'perovskite'. $BiNi_{1-x}Fe_xO_3$ exhibits a negative thermal expansion of 187 parts per million ($—187\times10^{-6}/°$ C.) per $1°$ C. of temperature rise in a temperature range around room temperature. Therefore, substantially the same effect is obtained with a half amount, as compared to $Bi_{0.95}La_{0.05}NiO_3$.

An operation of the gap adjustment pipe 115 configured as described above will be described with reference to FIG. 3.

The gas supplied from the outside flows along hollows of the hollow fiber membranes 112. The off-gas flowing into the mid-case 111 through the off-gas inlet 111a comes into contact with outer surfaces of the hollow fiber membranes 112 and then is discharged from the mid-case 111 through the off-gas outlet 111b. When the off-gas comes into contact with the outer surfaces of the hollow fiber membranes 112, moisture contained in the off-gas permeates the hollow fiber membranes 112 to humidify the air flowing along the hollows of the hollow fiber membranes 112.

In this case, a temperature of the off-gas varies depending on an output of the fuel cell stack. (a) of FIG. 3 is a case in which the output of the fuel cell stack is high, and (b) of FIG. 3 is a case in which the output of the fuel cell stack is low. When the output of the fuel cell stack is generally lower than 40 kW, this can be referred to as a low output environment, and when the output of the fuel cell stack is generally equal to or higher than 40 kW, this can be referred to as a high output environment.

In the high output environment, an off-gas at a relatively high temperature is supplied from the fuel cell stack, and in the low output environment, an off-gas at a relatively low temperature is supplied from the fuel cell stack. Here, the high temperature may be in a range of about 50 to 150° C., and may be a second temperature range higher than the first temperature range. Here, the low temperature may be the first temperature range of lower than about 50° C.

Referring to (a) of FIG. 3, since the off-gas is at high temperature, the gap adjustment pipe 115 having a negative thermal expansion property contracts to increase the gap between the hollow fiber membranes 112, making it possible to increase a space in which an off-gas at high temperature can flow and adjust an amount of humidification and a speed of humidification of dry air by the off-gas so that the amount of humidification and the speed of humidification increase.

Referring to (b) of FIG. 3, since the off-gas is at low temperature, the gap adjustment pipe 115 having a negative thermal expansion property expands to decrease a gap between the hollow fiber membranes 112, making it possible to decrease a space in which an off-gas at low temperature can flow and adjust the amount of humidification and the speed of humidification of the dry air by the off-gas so that the amount of humidification and the speed of humidification decrease.

According to the first embodiment of the present invention as described above, the membrane humidifier is configured in a simple structure without additional separate parts, and it is possible to automatically adjust the gap between the hollow fiber membranes 112 depending on an output situation of the fuel cell stack, making it possible to reduce a size of the membrane humidifier and to reduce a manufacturing cost.

Figure 4:
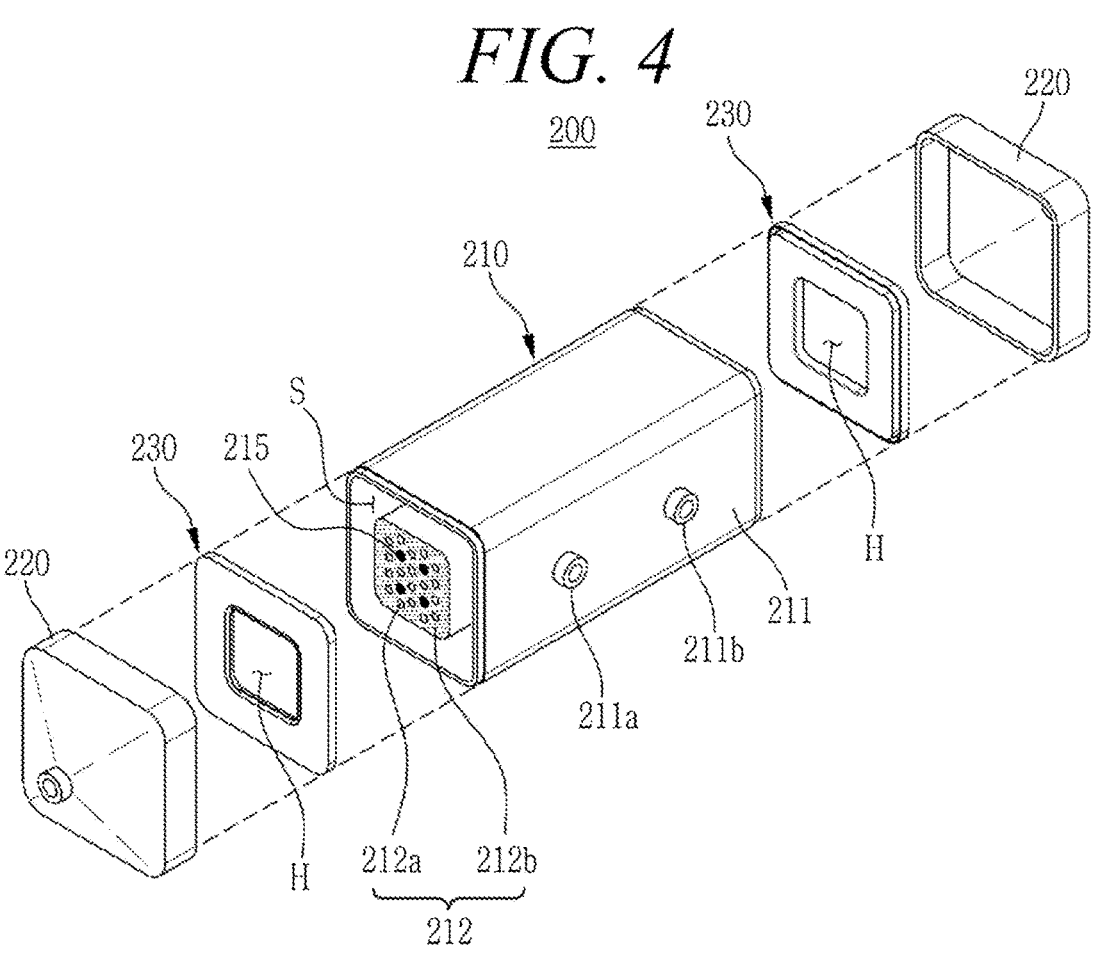
FIG. 4 is an exploded perspective view illustrating a fuel cell membrane humidifier according to a second embodiment of the present invention.
Figure 5:
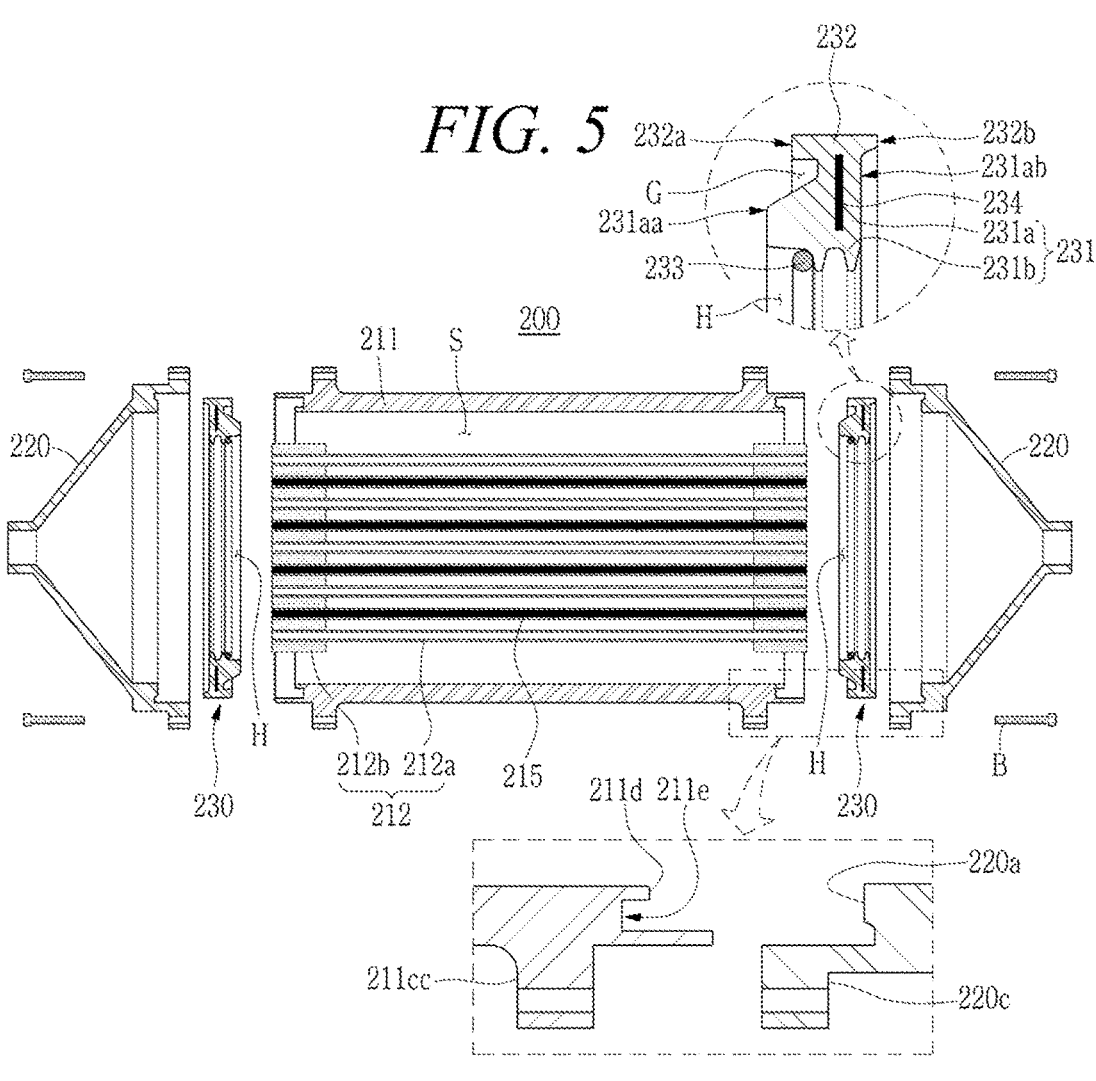
FIG. 5 is an exploded cross-sectional view illustrating the fuel cell membrane humidifier according to the second embodiment of the present invention.
Figure 6:
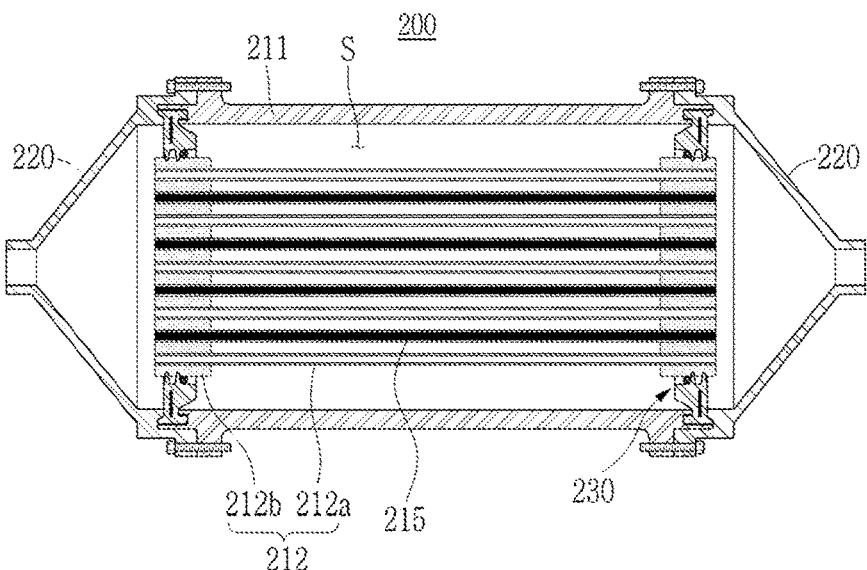
FIG. 6 is a combined cross-sectional view illustrating the fuel cell membrane humidifier according to the second embodiment of the present invention.

Next, a fuel cell membrane humidifier according to a second embodiment of the present invention will be described with reference to FIGS. 4 to 6. FIG. 4 is an exploded perspective view illustrating the fuel cell membrane humidifier according to a second embodiment of the present invention, FIG. 5 is an exploded cross-sectional view illustrating the fuel cell membrane humidifier according to the second embodiment of the present invention, and FIG. 6 is a combined cross-sectional view illustrating the fuel cell membrane humidifier according to the second embodiment of the present invention.

Figure 1:
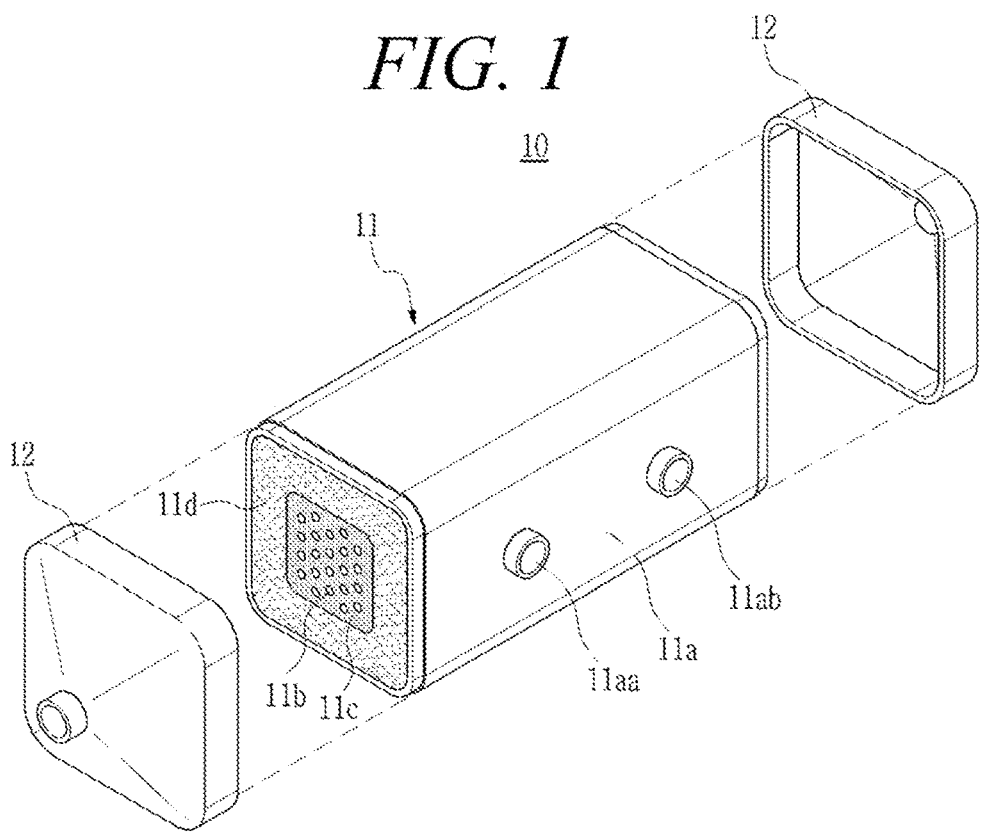
FIG. 1 is an exploded perspective view illustrating a fuel cell membrane humidifier according to the related art.

Referring to the membrane humidifier 10 of the related art in FIG. 1, the potting portion 11c to which ends of the plurality of hollow fiber membranes lib are fixed, and a resin layer 11d between the potting portion 11c and the mid-case 11a block the inner spaces of the caps 12 and the inner space of the mid-case 11a. The resin layer 11d is generally formed by curing a liquid polymer such as liquid polyurethane resin through a casting scheme, similar to the potting portion 11c. However, since a casting process for forming the resin layer 11d requires a relatively long process time, the productivity of the membrane humidifier 10 is degraded.

Further, since the resin layer 11d is adhered to an inner wall of the mid-case 11a as well as the potting portion 11c, the entire humidification module 11 should be replaced when a problem occurs in the hollow fiber membranes 11b, which incurs a huge maintenance cost.

Further, a repetitive operation of the fuel cell is highly likely to cause a gap between the resin layer 11d and the mid-case 11a. That is, as an operation and stop of the fuel cell are repeated, expansion and contraction of the resin layer 11d alternately occur, and a difference in coefficient of thermal expansion between the mid-case 11a and the resin layer 11d is highly likely to cause separation of the resin layer 11d from the mid-case 11a. As described above, when the gap is caused between the resin layer 11d and the mid-case 11a, air leakage occurs due to a pressure difference, an amount of humidified air supplied to the fuel cell stack is reduced, and the efficiency of power generation of the fuel cell is degraded.

To solve this problem, a fuel cell membrane humidifier 200 of the present invention includes a humidification module 210, caps 220, and a gasket assembly 230, as illustrated in FIGS. 4 to 6.

The humidification module 210 humidifies the air supplied from the outside with moisture in the off-gas discharged from the fuel cell stack. Both ends of the humidification module 210 are coupled to the caps 220. One of the caps 220 supplies the air supplied from the outside to the humidification module 210, and the other supplies air humidified by the humidification module 210 to the fuel cell stack. The gasket assembly 230 is airtightly coupled to each end of the humidification module 210 through mechanical assembly.

The humidification module 210 is a device in which moisture exchange between the air supplied from the outside and an off-gas occurs, and may include a mid-case 211 having an off-gas inlet 211a and an off-gas outlet 211b, and at least one cartridge 212 disposed in the mid-case 211.

The mid-case 211 and the cap 220 may be independently formed of hard plastic or metal, and may have a cross section in a width direction having a circular or polygonal shape. The "circular shape" includes an oval shape, and the "polygonal shape" includes a polygonal shape with rounded corners. Examples of the hard plastic may include polycarbonate, polyamide (PA), polyphthalamide (PPA), and polypropylene (PP). An inner space of the mid-case 211 may be partitioned into a first space S1 and a second space S2 by partitions 211c (see FIG. 8)

The cartridge 212 may include a plurality of hollow fiber membranes 212a and a potting portion 212b that fixes the plurality of hollow fiber membranes 212a to each other. Ends of the hollow fiber membranes 212a may be fixed to the potting portion 212b. Further, a gap adjustment pipe 215 is disposed between the hollow fiber membranes 212a. Since the gap adjustment pipe 215 is substantially the same as the gap adjustment pipe 115 of the first embodiment described above, repeated description thereof will be omitted.

The gasket assembly 230 may be airtightly coupled to each end of the humidification module 210 through mechanical assembly. since air leakage between the mid-case 211 and the cap 220 is prevented through mechanical assembly of the gasket assembly 230, it is possible to omit a casting process (that is, a process of injecting a liquid resin into a mold and curing the liquid resin) and an additional sealing process (that is, a process of applying and curing a sealant) of the related art, for example.

Further, the gasket assembly 230 is mounted on the humidification module 200 through mechanical assembly, and thus, when an abnormality occurs in a specific portion (for example, the cartridge 212) of the humidification module 210, it is possible to simply mechanically separate the gasket assembly 230 from the humidification module 210 and then, repair or replace only the portion.

The gasket assembly 230 includes a packing portion 231, an edge portion 232, and a sealing portion 233. The packing portion 231 and the edge portion 232 may be formed of an elastic material (for example, silicone or rubber) having a first hardness of 20 to 70 Shore A and, preferably, 30 to 60 Shore A. The sealing portion 233 may include at least one of a solid sealing material and a liquid sealing material. The solid sealing material may be made of a material such as silicone, acrylic rubber, EPDM, or NBR, and the liquid sealing material may be made of a material such as silicone or urethane.

The packing portion 231 includes a hole H into which an end (for example, the potting portion 212b) of the cartridge 212 is inserted, and is interposed between the mid-case 211 and the cartridge 212. The packing portion 231 includes a body member 231a and a protrusion member 231b.

The body member 231a includes a hole H into which an end (for example, the potting portion 212b) of the cartridge 212 is inserted, and the hole H is formed in a shape corresponding to that of the end of the cartridge 212. A lower body member 231aa formed to protrude from the body member 231a toward the mid-case 211 may be formed in a polygonal cross section shape (for example, a trapezoidal shape), and an upper body member 231ab formed toward the cap 220 may be formed in a planar shape. A space in which the sealing portion 233 is disposed is formed between the lower body member 231*aa* and the cartridge potting portion 212*b*. Further, a groove G into which an end 211*d* of the mid-case 211 is fitted is formed between the lower body member 231*aa* and the edge portion 232.

The protrusion member 231*b* is formed at one end of the body member 231*a* to come into contact with the cartridge potting portion 212*b* inserted into the hole H. The protrusion member 231*b* may be at least one annular protrusion protruding from the one end of the body member 231*a*. The protrusion member 231*b* presses and comes into contact with the cartridge potting portion 212*b* according to an elastic force to make a space of the mid-case 211 and a space of the cap 220 airtight. Therefore, the protrusion member 231*b* can prevent a fluid in the mid-case 211 from flowing into the space formed on the cap 120 side. Further, since the protrusion member 231*b* has elasticity, the protrusion member 231*b* can perform a vibration dampening function, and thus, prevent the humidifier 200 from being damaged by vibration.

The edge portion 232 is formed at the other end of the body member 231*a*. The edge portion 232 may be interposed in a space formed by a groove 211*e* formed at an end of the mid-case and an end 220*a* of the cap. The edge portion 232 may include edge wings 232*a* and 232*b* protruding in both directions. The edge wings 232*a* and 232*b* may be formed in a longitudinal direction of the humidification module 210. When assembling is performed, the edge wings 232*a* and 232*b* are inserted into the groove 211*e* at the end of the mid-case, the edge wing 232*b* is pressed by the end 220*a* of the cap, and then, assembly is performed by fastening using a fastening means such as a bolt B. In this case, since the edge wings 232*a* and 232*b* are made of an elastic material, the edge wings 232*a* and 232*b* may be interposed with a space of the groove 211*e* at the end of the mid-case partially filled with the edge wings 232*a* and 232*b*. Fastening fragments 211*c* and 220*c* having fastening holes for fastening bolts may be formed on side surfaces of ends of the mid-case 211 and the cap 220. The edge wings 232*a* and 232*b* may make the groove 211*e* at the end of the mid-case airtight to seal the inside and outside of the mid-case 211, and the mid-case 211, and the cap 220.

The sealing portion 233 is formed between the cartridge 212 and the packing portion 231 to come into contact with the cartridge 212 and the packing portion 231. Specifically, the sealing portion 233 is formed to simultaneously come into contact with (or adhere to) the potting portion 212*b* of the cartridge and the lower body member 231*aa* of the packing portion. The sealing portion 233 makes the space of the mid-case 211 and the space of the cap 220 airtight to prevent the fluid in the mid-case 211 from flowing toward the cap 220.

Further, the gasket assembly 230 may further include a reinforcing member 234. The reinforcing member 234 may have a second hardness higher than the first hardness. For example, the reinforcing member 234 may be formed of metal, a thermoplastic or thermosetting resin, or the like. The reinforcing member 234 may be formed to be inserted into the gasket assembly 230 by being manufactured after a metal plate is inserted into a mold at the time of molding of the gasket assembly 230. The reinforcing member 234 may be formed to be inserted into at least a portion of the packing portion 231 and at least a portion of the edge portion 232. The reinforcing member 234 may be formed at a portion of the gasket assembly 230 that is vulnerable to deformation (a portion in which the groove G is formed). The reinforcing member 234 having a hardness higher than the packing portion 231 and the edge portion 232 can prevent the body member 231*a* from being deformed when the gasket assembly 230 is mechanically assembled into the humidification module 210 or while the humidifier is operating, to block air leakage more reliably.

According to the second embodiment of the present invention as described above, since air leakage between the mid-case 211 and the cap 220 is prevented through mechanical assembly of the gasket assembly 230, it is possible to omit, for example, a casting process (that is, a process of injecting a liquid resin into a mold and curing the liquid resin) and an additional sealing process (that is, a process of applying and curing a sealant) of the related art. Therefore, it is possible to dramatically improve the productivity of the fuel cell membrane humidifier 200 by reducing a production process time of the fuel cell membrane humidifier 200 while preventing air leakage between the mid-case 211 and the cap 220.

Further, the gasket assembly 230 is mounted on the humidification module 210 through mechanical assembly, and thus, when an abnormality occurs in a specific portion (for example, the cartridge 212) of the humidification module 210, it is possible to simply mechanically separate the gasket assembly 230 from the humidification module 210 and then, repair or replace only the portion. Therefore, according to the present embodiment, it is possible to greatly reduce a maintenance cost of the fuel cell membrane humidifier 200.

Figure 7:
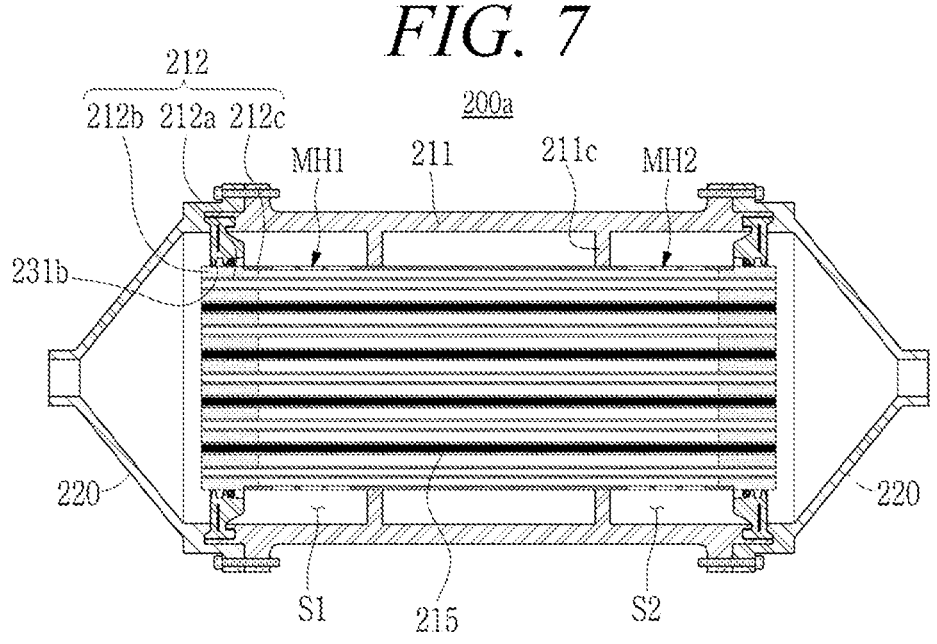
FIGS. 7 and 8 are combined cross-sectional views illustrating modification examples of the fuel cell membrane humidifier according to the second embodiment of the present invention.
Figure 8:
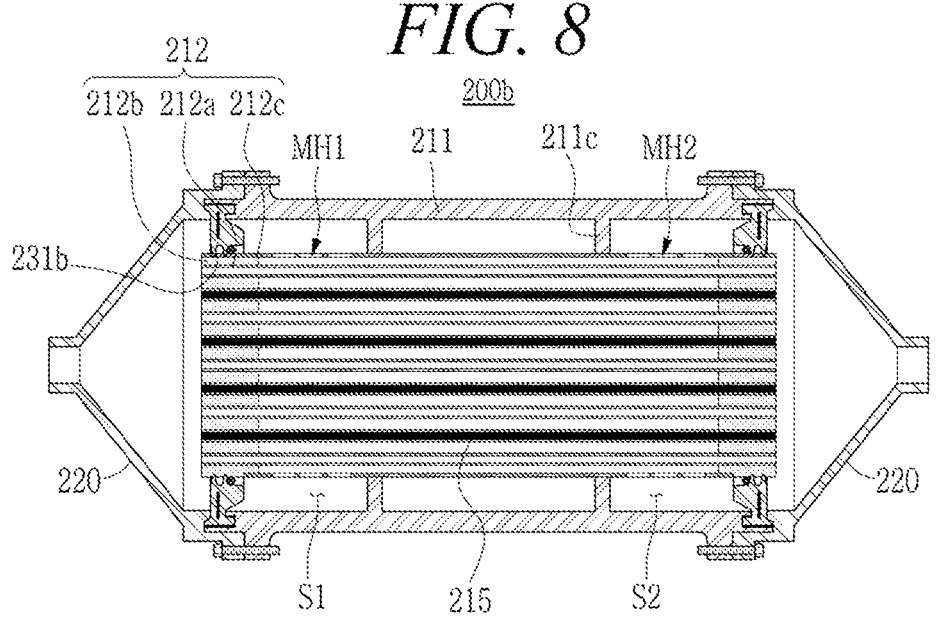

Next, modification examples of the fuel cell membrane humidifier according to the second embodiment of the present invention will be described with reference to FIGS. 7 and 8. FIGS. 7 and 8 are combined cross-sectional views illustrating modification examples of the fuel cell membrane humidifier according to the second embodiment of the present invention.

Referring to FIGS. 7 and 8, the modification examples 200*a* and 200*b* of the fuel cell membrane humidifier according to the second embodiment of the present invention are substantially the same as the fuel cell membrane humidifier 200 according to the second embodiment except that (i) an inner space of a mid-case 211 is partitioned into a first space S1 and a second space S2 by partitions 211*c*, and (ii) a cartridge 212 further includes an inner case 212*c*.

The inner case 212*c* has an opening at each end, and hollow fiber membranes 122*a* and a gap adjustment pipe 215 are accommodated in the opening. Potting portions 212*b* to which ends of the hollow fiber membranes 212*a* are potted close the openings of the inner case 212*c*.

As illustrated in FIG. 7, at least a portion of the potting portion 212*b* may be located outside the inner case 212*c*, and the protrusion member 231*b* of the gasket assembly 230 may come into close contact with the potting portion 212*b*. Alternatively, as illustrated in FIG. 8, the entire potting portion 212*b* may be located inside the inner case 212*c*, and the protrusion member 231*b* of the gasket assembly 230 may come into close contact with the inner case 212*c* rather than the potting portion 212*b*.

The inner case 212*c* includes a plurality of holes (hereinafter referred to as 'first mesh holes') MH1 arranged in a mesh form for fluid communication with the first space S1, and a plurality of holes (hereinafter referred to as 'second mesh holes') MH2 arranged in a mesh form for fluid communication with the second space S2.

An off-gas flowing into the first space S1 of the mid-case 211 through an off-gas inlet 211*a* flows into the inner case 212*c* through the first mesh holes MH1 and comes into contact with outer surfaces of the hollow fiber membranes 212*a*. Subsequently, the off-gas deprived of moisture exits to the second space S2 through the second mesh holes MH2, and then, is discharged from the mid-case 211 through an off-gas outlet 211*b*. Such a cartridge 212 including the inner case 212*c* has an advantage of being able to be easily assembled into the mid-case 211 and easily replaced.

Figure 9:
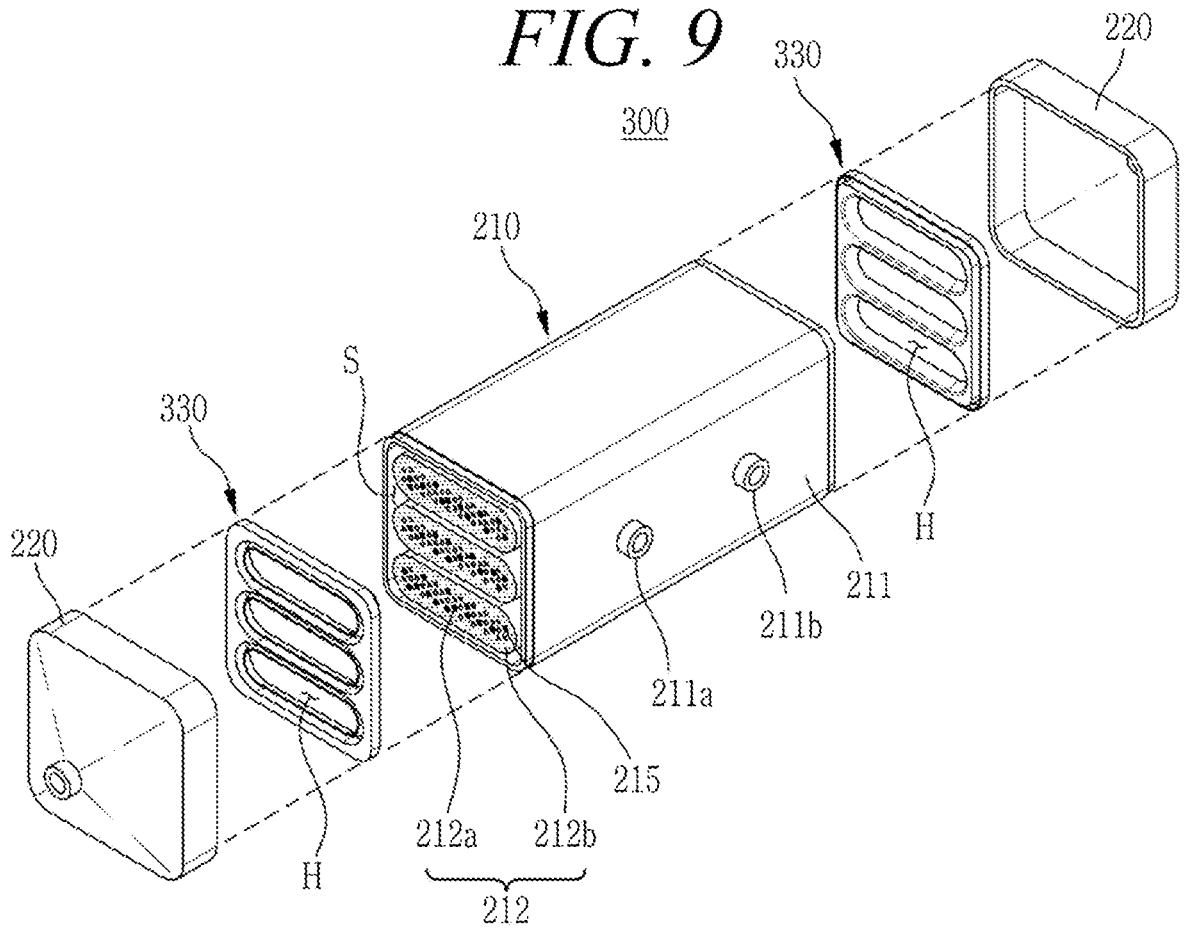
FIG. 9 is an exploded perspective view illustrating a fuel cell membrane humidifier according to a third embodiment of the present invention.

Next, a fuel cell membrane humidifier according to a third embodiment of the present invention and a modification example thereof will be described with reference to FIGS. 9 to 11. FIG. 9 is an exploded perspective view illustrating the fuel cell membrane humidifier according to the third embodiment of the present invention, FIG. 10 is an exploded cross-sectional view illustrating the fuel cell membrane humidifier according to the third embodiment of the present invention, FIG. 11 is a combined cross-sectional view of the fuel cell membrane humidifier according to the third embodiment of the present invention, and FIG. 12 is a combined cross-sectional view illustrating a modification example of the fuel cell membrane humidifier according to the third embodiment of the present invention.

Figure 10:
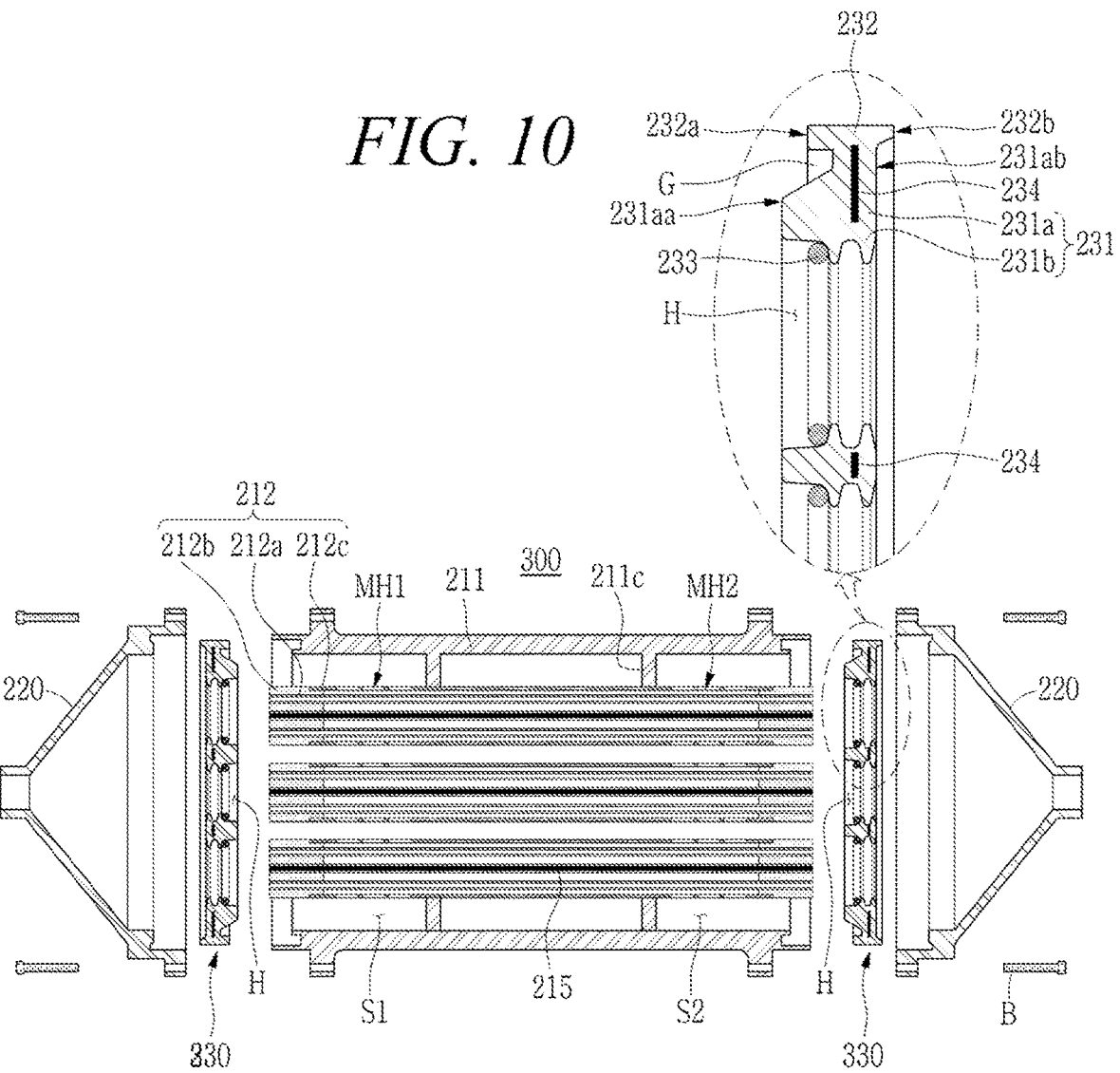
FIG. 10 is an exploded cross-sectional view illustrating the fuel cell membrane humidifier according to the third embodiment of the present invention.
Figure 11:
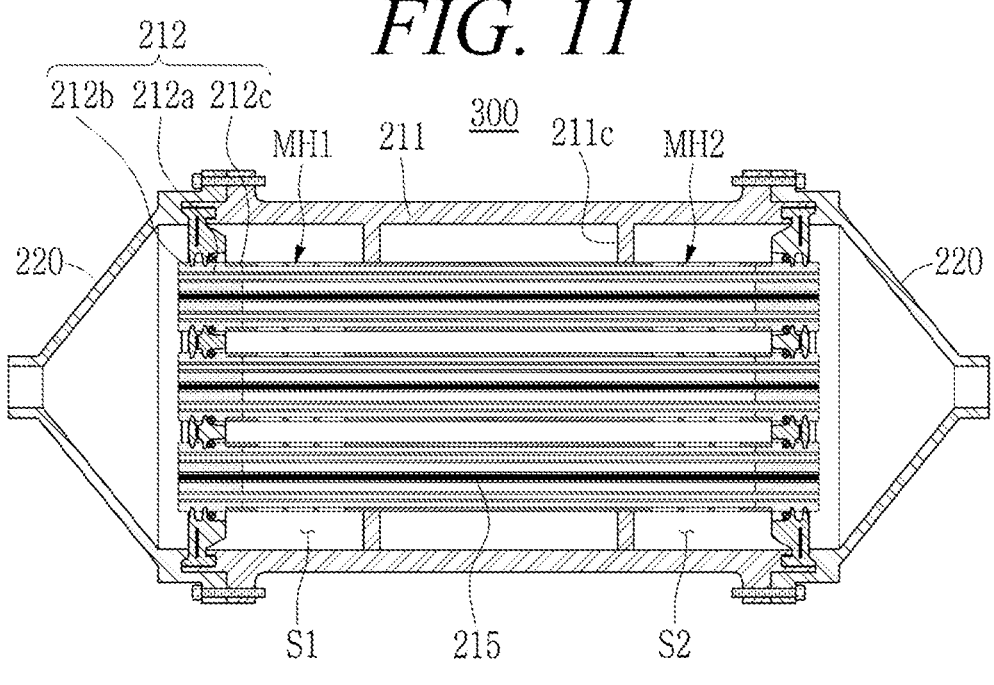
FIG. 11 is a combined cross-sectional view illustrating the fuel cell membrane humidifier according to the third embodiment of the present invention.

As illustrated in FIGS. 9 to 11, the fuel cell humidifier 300 according to the third embodiment of the present invention is substantially the same as the fuel cell humidifier 200 according to the second embodiment described above except that (i) a humidification module 210 includes two or more cartridges 212, (ii) a gasket assembly 330 includes two or more holes H into which cartridges 212 are inserted, (iii) two or more protrusion members 231*b* formed at one end of a body member 231*a* to come into contact with a cartridge potting portion 212*b* are included, and (iv) two or more sealing portions 233 formed to come into contact with the cartridge 212 and a packing portion 231 between the cartridge 212 and the packing portion 231 are included.

A plurality of cartridges 212 each including an inner case 212*c* are mounted in a mid-case 211 at regular intervals, making it possible to uniformly distribute an off-gas to all hollow fiber membranes 212*a* present in the mid-case 211, and to selectively replace only the specific cartridge 212 in which a problem occurs, thereby further reducing a maintenance cost of the fuel cell membrane humidifier 300.

Figure 12:
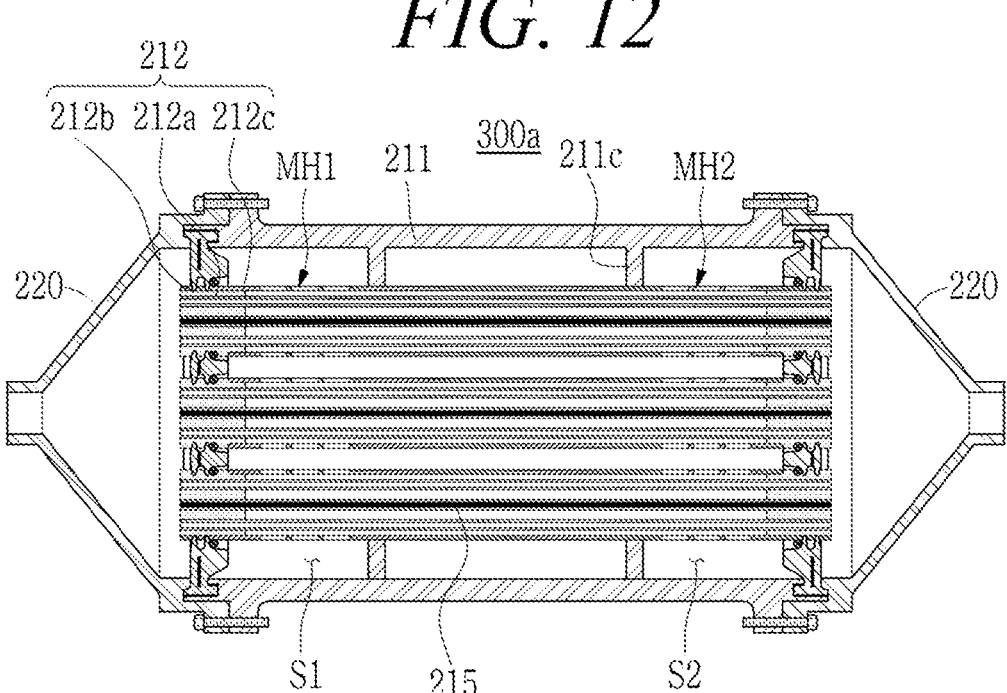
FIG. 12 is a combined cross-sectional view illustrating a modification example of the fuel cell membrane humidifier according to the third embodiment of the present invention.

Meanwhile, a modification example 300*a* of the fuel cell membrane humidifier according to the third embodiment of the present invention is substantially the same as the fuel cell humidifier 300 according to the third embodiment described above except that the entire potting portion 212*b* of each cartridge 212 is located in the corresponding inner case 212*c* and the protrusion members 231*b* of the gasket assembly 330 come into close contact with the inner case 212*c* rather than the potting portions 212*b*, as illustrated in FIG. 12.

Although the embodiment of the present invention has been described above, those skilled in the art can variously modify or change the present invention through affixation, change, deletion, addition, or the like of components without departing from the spirit of the present invention described in the claims, and this will be said to be also included within the scope of the present invention.

Detailed Description of Main Elements

100, 200, 200*a*, 200*b*, 300, 300*a*: fuel cell membrane humidifier
110, 210: humidification module 111, 211: mid-case
111*a*, 211*a*; off-gas inlet 111*b*, 211*b*: off-gas outlet
211*c*: partition wall 212: cartridge
112, 212*a*: hollow fiber membrane 113, 212*b*: potting portion
212*c*: inner case 115, 215: gap adjustment pipe
120, 220: cap 230, 330: gasket assembly

231: packing portion 231*a*: body member
231*b*: protrusion member 232: edge portion
233: sealing portion 234: reinforcing member

The invention claimed is:

1. A fuel cell membrane humidifier comprising:
a mid-case;
a cap fastened to the mid-case;
a plurality of hollow fiber membranes disposed inside the mid-case and perform moisture exchange between air supplied from the outside and an off-gas flowing into the inside from a fuel cell stack to humidify the air;
a gap adjustment pipe disposed between the plurality of hollow fiber membranes and formed of a material having a different coefficient of thermal expansion from the plurality of hollow fiber membranes to adjust gaps between the plurality of hollow fiber membranes depending on a temperature of the off-gas,
a humidification module including an inner case configured to accommodate the plurality of hollow fiber membranes, and at least one cartridge including potting portions formed at ends of the inner case; and
a gasket assembly,
wherein the gasket assembly includes
a packing portion including a body member having a hole into which an end of the cartridge is inserted, and a protrusion member formed at one end of the body member and coming into contact with the end of the cartridge inserted into the hole to prevent a fluid in the mid-case from flowing toward the cap;
an edge portion formed at the other end of the body member and formed in a space formed by a groove formed at an end of the mid-case and an end of the cap; and
a sealing portion formed to come into contact with the cartridge and the packing portion to prevent the fluid in the mid-case from flowing toward the cap.

2. The fuel cell membrane humidifier of claim 1, wherein the gap adjustment pipe includes a negative thermal expansion material expanding in a first temperature range and contracting in a second temperature range greater than the first temperature range.

3. The fuel cell membrane humidifier of claim 2, wherein the gap adjustment pipe includes bismuth (Bi).

4. The fuel cell membrane humidifier of claim 2, wherein the gap adjustment pipe includes oxides of bismuth (Bi), lanthanum (La), and nickel (Ni).

5. The fuel cell membrane humidifier of claim 2, wherein the gap adjustment pipe includes oxides of bismuth (Bi), iron (Fe), and nickel (Ni).

6. The fuel cell membrane humidifier of claim 1, wherein the body member includes two or more holes into which two or more cartridges are able to be inserted, two or more protrusion members are included and formed in contact with ends of the two or more cartridges, and two or more sealing portions are included and formed to come into contact with the two or more cartridges and the packing portion.

7. The fuel cell membrane humidifier of claim 1, wherein the protrusion member presses and comes into contact with the end of the cartridge according to elastic force to make a space on the mid-case side and a space on the cap side airtight.

8. The fuel cell membrane humidifier of claim 1,
wherein the edge portion includes edge wings protruding in both directions, and the edge wings are interposed with the groove formed at the end of the mid-case filled with the edge wings, to seal the inside and outside of the mid-case, the mid-case, and the cap.

9. The fuel cell membrane humidifier of claim 1, wherein each of the packing portion and the edge portion has a first hardness of 30 to 70 Shore A, and the fuel cell membrane humidifier further comprises a reinforcing member formed to be inserted into at least a portion of the packing portion and at least a portion of the edge portion, the reinforcing member having a second hardness higher than the first hardness.

\* \* \* \* \*